United States Patent
Giuffré

(10) Patent No.: US 8,651,819 B2
(45) Date of Patent: Feb. 18, 2014

(54) ANTI-OVALIZATION TOOL FOR INTRODUCTION INTO A WIND TURBINE BLADE ROOT AND METHOD OF REDUCING OVALIZATION OF A WIND TURBINE BLADE ROOT

(71) Applicant: Alstom Wind, S.L.U., Barcelona (ES)

(72) Inventor: Gian Piero Giuffré, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/740,037

(22) Filed: Jan. 11, 2013

(65) Prior Publication Data

US 2013/0183158 A1 Jul. 18, 2013

Related U.S. Application Data

(60) Provisional application No. 61/612,799, filed on Mar. 19, 2012.

(30) Foreign Application Priority Data

Jan. 17, 2012 (EP) .................................... 12382014

(51) Int. Cl.
*F03D 1/00* (2006.01)
(52) U.S. Cl.
USPC .................................. 416/209; 416/244 R
(58) Field of Classification Search
USPC ............. 416/248, 232, 233, 204 R, 209, 224, 416/239, 244 R, 245 R; 29/889.72, 889.722, 29/463
See application file for complete search history.

(56) References Cited

U.S. PATENT DOCUMENTS

| | | | | |
|---|---|---|---|---|
| 2,687,763 A * | 8/1954 | Perkins | ........................... | 72/392 |
| 3,961,516 A | 6/1976 | Priester | | |
| 4,475,373 A * | 10/1984 | Ikenberry | ....................... | 72/392 |
| 8,141,286 B1 * | 3/2012 | Saur | .................................. | 42/74 |
| 2006/0285937 A1 | 12/2006 | Wobben | | |
| 2007/0248431 A1 | 10/2007 | Jensen | | |

FOREIGN PATENT DOCUMENTS

| | | |
|---|---|---|
| EP | 2 345 810 | 7/2011 |
| JP | 2000-334629 | 12/2000 |
| WO | WO 2009/085041 | 7/2009 |

OTHER PUBLICATIONS

European Search Report for EP 12382014, mailed Jun. 13, 2012, 4 pgs.

* cited by examiner

*Primary Examiner* — Edward Look
*Assistant Examiner* — Maxime Adjagbe
(74) *Attorney, Agent, or Firm* — Squire Sanders (US) LLP

(57) ABSTRACT

Anti-ovalization tool for introduction into a wind turbine blade root comprising two or more rigid bodies connected to one another along their side edges with distances in between them and together forming a substantially cylindrical body, wherein the distances between the rigid bodies are adjustable. The invention is further related to the method of reducing ovalization of a wind turbine blade root and to the use of a tool comprising two or more rigid bodies as an anti-ovalization tool.

14 Claims, 3 Drawing Sheets

ANTI-OVALIZATION TOOL FOR INTRODUCTION INTO A WIND TURBINE BLADE ROOT AND METHOD OF REDUCING OVALIZATION OF A WIND TURBINE BLADE ROOT

This application claims the benefit of European Patent Application 12382014.4 filed on Jan. 17, 2012 and U.S. Provisional Patent Application Ser. No. 61/612,799 filed on Mar. 19, 2012.

The present invention relates to an anti-ovalization tool for introduction into a wind turbine blade root. The invention further relates to a wind turbine blade and to a wind turbine comprising such a tool.

Furthermore, the invention relates to a method of reducing ovalization of a wind turbine blade root.

BACKGROUND ART

The blades in a wind turbine are typically attached, at a blade root portion, to a rotor hub, either directly or through an extender.

Typically, the blades are made from composite materials: reinforcing fibres may be bonded to one another with a resin and, subsequently, cured to consolidate. Different kinds of fibres (e.g. glass, carbon, combinations) and resins (e.g. epoxy) may be used in different forms (e.g. prepreg, fibre sheets). Such composite materials may not have the structural integrity to provide a secure fixing mechanism into which, for example, threaded bolts may be directly inserted. For this reason, it is known for wind turbine blades to comprise metal inserts or bushings which are embedded into the blade root in a direction parallel to that of the longitudinal axis of the blade. Studs, bolts or rods can be used in combination with these bushings to achieve a secure connection between the hub or extender and the blade. It is thus important for a blade root portion to comprise a circular mounting surface matching the hub's or extenders' mounting surface.

A manufacturing process of a blade of a wind turbine in general terms may comprise a first step of moulding and curing two separate longitudinal blade halves made out of composite material and a second step of joining together these two blade halves and removing the final blade from the mould. Alternatively, a complete blade may be manufactured in a single moulding step.

In order to accelerate manufacturing processes, it is becoming common practice nowadays to join two blade halves together and remove them from the mould relatively quickly. In these cases, the resin may not be fully cured yet and the blades may still be relatively soft. Furthermore, composite materials are well-known for shrinking upon curing. Both things may cause a deformation of the blade root portion of the blade that may lead to incompatibilities between the hub and the blade root or to a cumbersome blade mounting process.

Furthermore, once a blade has been manufactured it may remain in storage until the wind turbine is finally installed. Typically, said storage may last from one month up to one year. Although composite materials reduce the blades' weight, it is important to consider the fact that a finished blade, made of composite, still has a considerable weight.

Therefore, a problem derived from above mentioned storage time is that the blade root portion may deform in the storage position due to the weight of the whole blade. The force of the weight acts on the blade root portion thus causing an ovalization of the circular blade root mounting surface.

In practice, a deformation of the blade root portion of a blade can at least complicate the blade mounting process and it can also lead to a more vulnerable attachment at the hub. Attachment holes of the blade may not be completely aligned with attachment holes of the hub or extender, and the studs or bolts used for connecting the blade to the hub may not be completely centered in their holes. In operation, they thus may be subjected to transverse loads, potentially shortening their lifetime and the lifetime of the blades.

SUMMARY OF THE INVENTION

It is an object of the present invention to at least partially overcome some of above mentioned drawbacks.

In a first aspect, an anti-ovalization tool for introduction into a wind turbine blade root is provided. The anti-ovalization tool comprises two or more rigid bodies connected to one another along their side edges with distances in between them. The rigid bodies together form a substantially cylindrical body wherein the distances between the rigid bodies are adjustable.

According to this aspect, the fact that the rigid bodies together form a substantially cylindrical body in combination with the fact that there are distances in between them that are adjustable permit a variation of the diameter of the tool. This way the tool can be easily introduced e.g. inside a wind turbine blade root and the rigid bodies can subsequently be arranged against an inner wall of the blade root. Such a rigid tool may exert some pressure against the inner wall of the blade root which provides the blade root with extra rigidity. Said pressure exerted by the rigid tool against the inner wall of the blade root may be the minimal pressure required for reducing the deformation of the blade root such that the substantially circular dimensions of the blade root fall within acceptable tolerances. This way, a blade (or blade halves) may be removed from the mould before the curing process is fully completed and the rigid tool will act against deformation forces and thus reduce ovalization of the blade root. The manufacturing process of the blades may thus be accelerated with a substantially cost-effective solution. Furthermore, it may help increase the lifetime of the blades. As the circular shape of the blade root and its mounting surface may be better maintained, the mounting holes of the blade may thus be better aligned with those of the hub or extender and the studs connecting the blade to the hub may be better centered in such holes.

In some implementations, the anti-ovalization tool may be removed before installation of the blade on a wind turbine. In other implementations, the tool may be permanently mounted in the blade.

In some embodiments, the side edges of the rigid bodies may extend substantially parallel to a central axis of the cylinder formed by the rigid bodies.

In some embodiments, one or more rigid bodies may comprise a curved wall comprising one or more weight-saving holes. This way the extra weight added by the anti-ovalization tool to e.g. a wind turbine blade root, may be substantially reduced. Particularly, in implementations in which the anti-ovalization tool is permanently mounted in the blade root, a weight reduction of the tool may be important.

In some cases, the rigid bodies may be connected to each other by one or more hydraulic cylinders, the hydraulic cylinders may be controllable to adjust the distance between the rigid bodies. In others, the rigid bodies may be connected to each other by one or more turnbuckles, the turnbuckles may be adjustable to adjust the distance between the rigid bodies.

In other embodiments, other means for connecting the bodies and adjusting the distance between them may be foreseen.

In some embodiments, an external surface of the rigid bodies may comprise a layer of a deformable material for cushioning roughness's or imperfections of an inner wall of a wind turbine blade root. Such a deformable material may be made e.g. from an elastic material, such as a rubber. Alternatively, foam may be used.

In a second aspect a wind turbine blade is provided. The wind turbine blade may comprise a blade root portion for coupling to a hub or extender of the wind turbine, and the blade root portion may comprise an anti-ovalization tool substantially as hereinbefore described, wherein the anti-ovalization tool may be adjusted such that the rigid bodies exert a pressure against a blade root inner wall so that the rigid tool can delimit the circular shape desired as blade root inner diameter. This guarantees a circular geometry of the blade root mounting surface when it is installed to e.g. the pitch bearing for attachment to a wind turbine rotor hub. Moreover, it is cost-effective and easy to use.

In some embodiments, the blade may be manufactured from two longitudinal blade halves. The blade halves may be joined together such that, when being manufactured, the joints between the two blade halves may be in a first plane and the anti-ovalization tool may be arranged such that the side edges of the rigid bodies do not coincide with said first plane. It has been found that at the joint between the two blade halves, shrinkage may be substantial. Using this solution, shrinkage or deformation at the joints between the two blade halves may be reduced by ensuring the presence of at least a portion of the rigid bodies in such an area.

In a preferred embodiment, the blade may comprise an anti-ovalization tool comprising two semi-cylindrical rigid bodies. In these cases, the joints between two blade halves may be in a first plane and the anti-ovalization tool may be arranged such that the side edges of the two substantially semi-cylindrical bodies may be arranged in a plane substantially perpendicular to that of the joints between the two blades halves.

In another aspect a wind turbine comprising a blade substantially as hereinbefore described is provided.

A further aspect relates to a method of reducing ovalization of a wind turbine blade root of a blade manufactured from two longitudinal blade halves being joined together. In some embodiments, the method may comprise the step of introducing an anti-ovalization tool substantially as hereinbefore described inside the blade root and adjusting the distances between the rigid bodies of the anti-ovalization tool so as to position the rigid bodies against a blade root inner wall.

In some cases, the step of introducing the anti-ovalization tool inside the blade root may be carried out substantially directly after joining the two blade halves together. In others, it may be carried out substantially directly before joining the two blade halves together. In order to reduce unwanted deformation, the anti-ovalization tool is preferably introduced before the deformation takes place. In certain implementations however, the distances between the rigid bodies may be "over-adjusted", such that the rigid bodies exert a pressure against the inner blade wall that can undo an unwanted deformation.

In some implementations, the anti-ovalization tool may be shaped such as to allow a small deformation of the blade root.

A still further aspect relates to the use of a tool substantially as hereinbefore described as an anti-ovalization tool of a wind turbine blade root.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
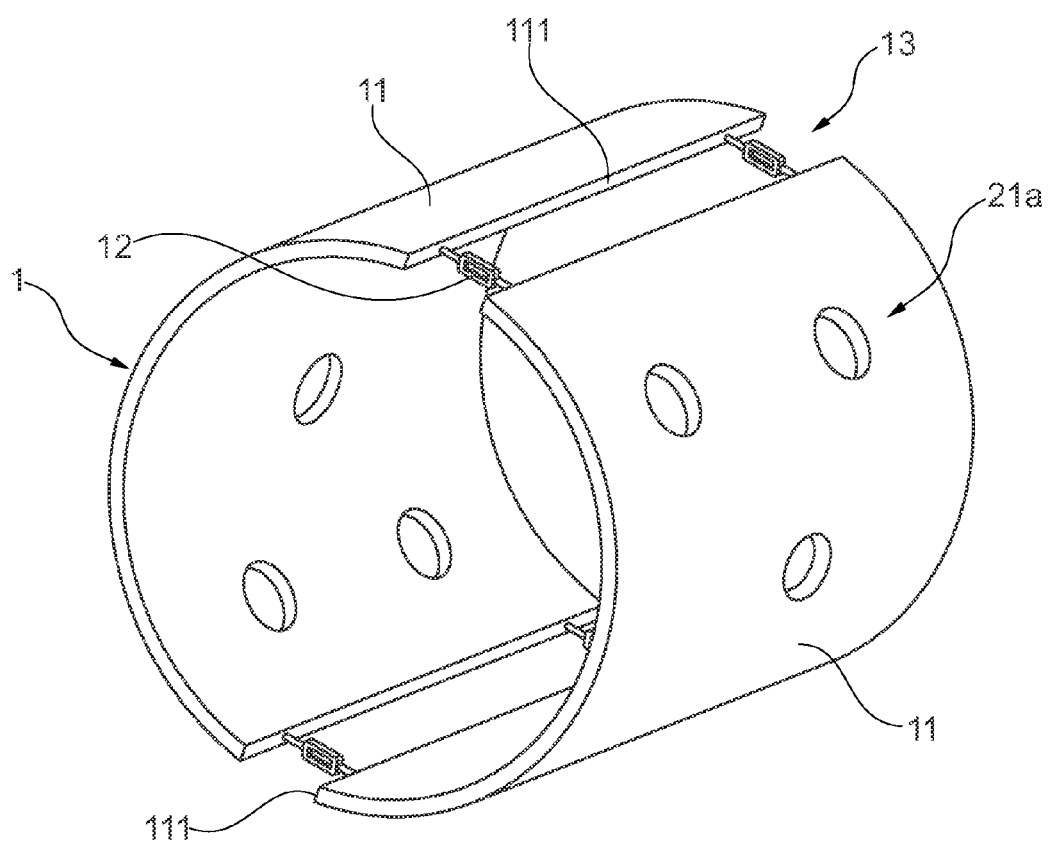
FIG. 1 shows a perspective view of an anti-ovalization tool according to a fist embodiment.

FIG. 1 shows a perspective view of an anti-ovalization tool according to a first embodiment. The anti-ovalization tool 1 may comprise two substantially semi-cylindrical rigid bodies 11. The rigid bodies 11 may be connected to each other by their side edges 111 with four turnbuckles 12, leaving two gaps 13 in between them. Together the rigid bodies 11 may form a substantially cylindrical body and their side edges 111 may extend parallel to a central axis of the cylinder.

It should be noted, that in other implementations, the tool may comprise more than two rigid bodies. In such cases the rigid bodies may form together a substantially cylindrical body leaving more than two gaps in between their side edges. In other implementations, such gaps may be filled with a deformable material. In further embodiments, naturally a different number of turnbuckles may be used.

It is noted that by adjusting the distances between the side edges of the rigid bodies, the shape of the tool may be modified. Before introduction in a blade, the cross-sectional shape of the tool may be more elliptical. After adjustment of the distances, the tool may be more cylindrical.

Figure 2A:
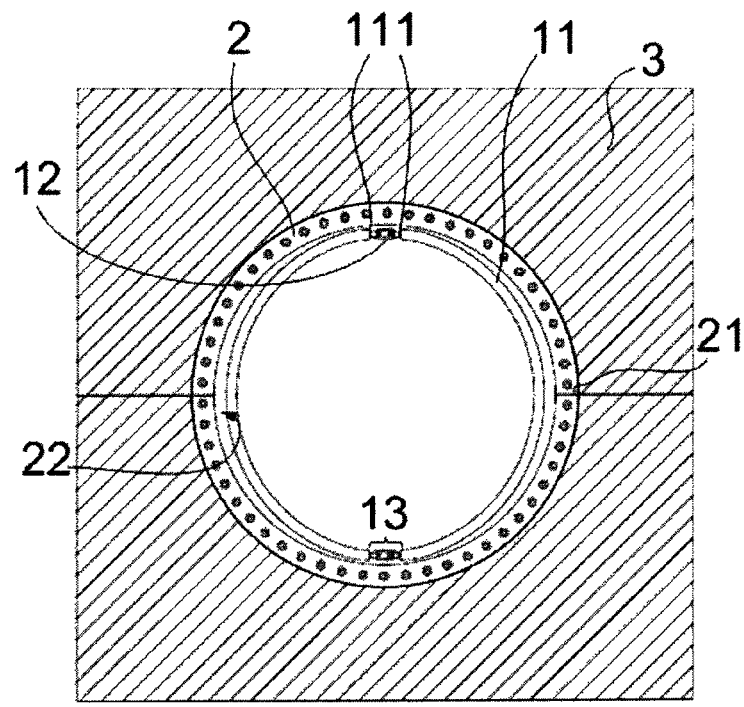
FIGS. 2a and 2b show a side view of a sequence of two situations of the anti-ovalization tool of FIG. 1 introduced in a wind turbine blade root.
Figure 2B:
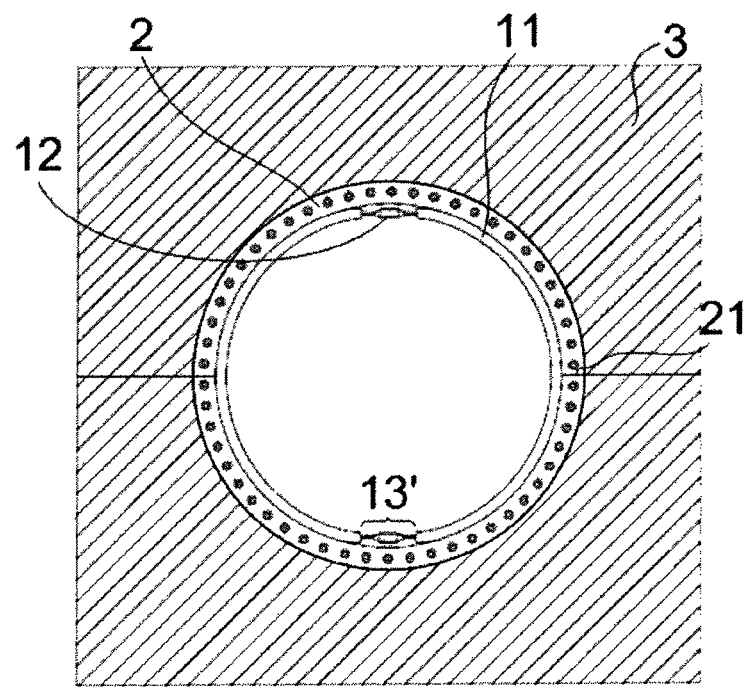

FIGS. 2a and 2b show a side view of a sequence of two situations of the anti-ovalization tool of FIG. 1 introduced in a wind turbine blade root. According to this embodiment, two blade root halves 2 may be in their respective moulds 3. The curing process of the blade halves may or may not have been fully completed.

According to FIGS. 2a and 2b, the two blade root halves 2 may be joined together and the joints 21 between them may be in a substantially horizontal plane. The two semi-cylindrical rigid bodies 11 may be connected to each other at their side edges 111 via four turnbuckles 12 (only two of them are visible), leaving two gaps 13 in between their side edges 111. The anti-ovalization tool may be arranged inside the blade root such that the gaps 13 in between the rigid bodies side edges 111 do not coincide with the joints 21 between the two blade root halves 2. In this example, the gaps 13 may thus be arranged in a substantially vertical plane. This way, at least at the joints 21, an outer surface of the rigid bodies 11 will be in contact with the inner wall of the blade root portion, thus at least locally reducing unwanted deformation.

FIG. 2a shows a situation in which the anti-ovalization tool has just been introduced inside the blade root. In this situation, an external surface of the rigid bodies may not yet be in full contact with an inner wall of the blade root (see arrow 22).

FIG. 2b shows a situation in which the anti-ovalization tool has been adjusted. In this situation, the turnbuckle 12 has been adjusted so that a wider gap 13' is now left in between the two rigid bodies side edges. In this case, the term "adjusting" means that the screws arranged at both ends of each turnbuckle 12 have been screwed out such that the resulting gap 13' is bigger than the original gap 13.

As shown in FIGS. 2a and 2b, the anti-ovalization tool can thus be easily introduced inside the wind turbine blade root as its diameter is slightly smaller than an inner diameter of the blade root and, after adjusting the turnbuckles 12, the rigid bodies 11 may be in full contact with the inner wall of the blade root.

Figure 3A:
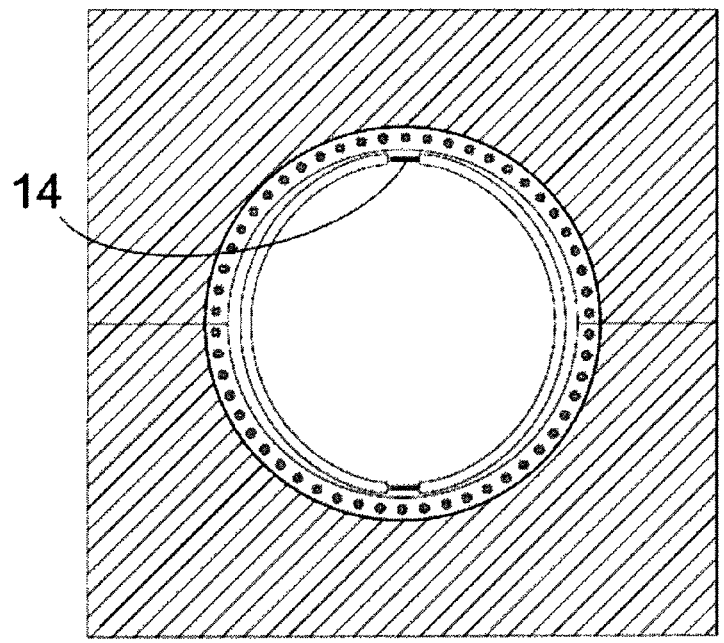
FIGS. 3a and 3b show a side view of a sequence of two situations of an anti-ovalization tool, according to a second embodiment, introduced in a wind turbine blade root.
Figure 3B:
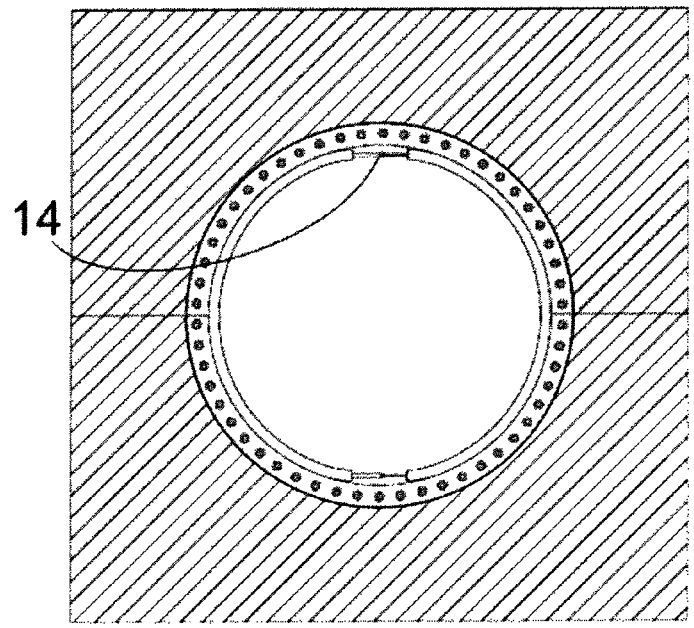

The example of FIGS. 3a and 3b differs from the example of FIGS. 2a and 2b only in the fact that the turnbuckles have been replaced by hydraulic cylinders and pistons 14. The hydraulic cylinders 14 may be controlled to adjust the gap or distance between the rigid bodies side edges in the same way explained before in connection with FIGS. 2a and 2b. It should be noted, that in other implementations, other connecting means may be used for connecting the rigid bodies to each other as long as they can adjust the distances in between the rigid bodies as explained above in connection with FIGS. 2a and 2b.

In all embodiments, the rigid bodies may be made from e.g. steel or a composite material. The rigid bodies may be substantially thin-walled and have a thickness of e.g. 5 to 10 mm. This way the wind turbine blade entrance may be free for maintenance operations which may be carried out directly after the manufacturing process or after a wind turbine blade has been installed in a wind turbine. Furthermore, the tool may be relatively light-weight. This is of special interest in those cases in which the anti-ovalization tool is left inside the blade root once the blade is attached to the rotor hub. The length of an anti-ovalization tool substantially as hereinbefore described may depend on the size of the wind turbine blade, especially on the length of the blade root portion, and may e.g. be approximately 50 cm.

In some embodiments, one or more rigid bodies may comprise curved walls having one or more weight-saving holes 21a (FIG. 1) in order to further reduce the weight of the tool.

As mentioned before, in some embodiments, a layer of a deformable material (e.g. elastic or visco-elastic) may be arranged on an external surface of the rigid bodies. Such a deformable material may be e.g. any natural or synthetic foam rubber.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. An anti-ovalization tool for introduction into a wind turbine blade root comprising two or more rigid bodies connected to one another along their side edges with distances in between them and together forming a substantially cylindrical body, wherein the rigid bodies are connected to each other by one or more turnbuckles, and wherein the turnbuckles are controllable to adjust the distance between the rigid bodies.

2. The anti-ovalization tool according to claim 1, wherein the cylindrical body has a central axis and the side edges of the rigid bodies extend substantially parallel to said central axis.

3. The anti-ovalization tool according to claim 1, wherein the rigid bodies are two semi-cylindrical rigid bodies.

4. The anti-ovalization tool according to claim 1, wherein one or more rigid bodies comprise a curved wall comprising one or more weight-saving holes.

5. The anti-ovalization tool according to claim 1, wherein the rigid bodies are made of steel or a composite material.

6. The anti-ovalization tool according to claim 1, wherein an external surface of one or more of the rigid bodies comprises a layer of a deformable material for cushioning roughness's of an inner wall of a wind turbine blade root.

7. A wind turbine blade comprising a blade root portion for coupling to a hub or extender of a wind turbine, the blade root portion comprising an anti-ovalization tool having two or more rigid bodies connected to one another along their side edges with distances in between them and together forming a substantially cylindrical body, wherein the tool is adjusted such that the rigid bodies exert pressure against a blade root inner wall.

8. The wind turbine blade according to claim 7, the blade being manufactured from two longitudinal blade halves, wherein the blade halves are joined together such that, when being manufactured, the joints between the two blade halves are in a first plane and the anti-ovalization tool is arranged such that the side edges of the rigid bodies do not coincide with said first plane.

9. A wind turbine blade for a wind turbine comprising a blade root portion for coupling to a hub or extender of the wind turbine, the blade root portion comprising an anti-ovalization tool according to claim 3 and the blade being manufactured from two longitudinal blade halves, wherein the blade halves are joined together such that, when being manufactured, the joints between the two blade halves are in a first plane and the anti-ovalization tool is arranged such that the side edges of the two substantially semi-cylindrical bodies are arranged in a plane substantially perpendicular to that of the joints between the two blades halves.

10. A wind turbine comprising a blade according to claim 7.

11. A method of reducing ovalization of a wind turbine blade root of a blade manufactured from two longitudinal blade halves being joined together, the method comprising the step of introducing an anti-ovalization tool having two or more rigid bodies connected to one another along their side edges with distances in between them and together forming a substantially cylindrical body inside the blade root and adjusting the distances in between the rigid bodies of the anti-ovalization tool so as to position the rigid bodies against a blade root inner wall.

12. The method according to claim 11, wherein the step of introducing the anti-ovalization tool inside the blade root is carried out substantially directly after joining the two blade halves together.

13. The method according to claim 11, wherein the step of introducing the anti-ovalization tool inside the blade root is carried out substantially directly before joining the two blade halves together.

14. The method according to claim 11, wherein the anti-ovalization tool is arranged such that the side edges of the rigid bodies are arranged in planes that do not coincide with a plane of the joint between the two blade halves.

* * * * *